US012087480B2

(12) United States Patent
Kaneko et al.

(10) Patent No.: US 12,087,480 B2
(45) Date of Patent: Sep. 10, 2024

(54) RESISTIVE MATERIAL, METHOD OF MANUFACTURING RESISTIVE MATERIAL, AND RESISTOR FOR DETECTING ELECTRIC CURRENT

(71) Applicant: KOA Corporation, Nagano (JP)

(72) Inventors: Reina Kaneko, Nagano (JP); Yoshitaka Kumeda, Nagano (JP); Tadahiko Yoshioka, Nagano (JP)

(73) Assignee: KOA Corporation, Nagano (JP)

( * ) Notice: Subject to any disclaimer, the term of this patent is extended or adjusted under 35 U.S.C. 154(b) by 208 days.

(21) Appl. No.: 17/754,031

(22) PCT Filed: Aug. 6, 2020

(86) PCT No.: PCT/JP2020/030241

§ 371 (c)(1),
(2) Date: Mar. 22, 2022

(87) PCT Pub. No.: WO2021/059772

PCT Pub. Date: Apr. 1, 2021

(65) Prior Publication Data

US 2022/0328217 A1 Oct. 13, 2022

(30) Foreign Application Priority Data

Sep. 25, 2019 (JP) ................................ 2019-174434

(51) Int. Cl.

| | |
|---|---|
| ***H01C 7/13*** | (2006.01) |
| ***H01C 17/02*** | (2006.01) |
| ***H01C 17/065*** | (2006.01) |

(52) U.S. Cl.
CPC ............... *H01C 7/13* (2013.01); *H01C 17/02* (2013.01); *H01C 17/06553* (2013.01)

(58) Field of Classification Search
CPC ..... H01C 7/13; H01C 17/02; H01C 17/06553
See application file for complete search history.

(56) References Cited

U.S. PATENT DOCUMENTS

2017/0186473 A1* 6/2017 Ikeda ..................... G11C 5/147

FOREIGN PATENT DOCUMENTS

| | | | | |
|---|---|---|---|---|
| CN | 105648267 A | 6/2016 | | |
| CN | 109994246 A | 7/2019 | | |
| JP | 2002075714 A | 3/2002 | | |
| JP | 2004119561 A | 4/2004 | | |
| JP | 2004260030 A * | 9/2004 | | |
| JP | 2006270078 A | 10/2006 | | |
| JP | 2010010405 A | 1/2010 | | |
| JP | 2010225627 A | 10/2010 | | |
| JP | 2018133166 A * | 8/2018 | | |
| WO | WO-2021221173 A1 * | 11/2021 | ......... | H01C 17/0654 |

OTHER PUBLICATIONS

JP-2004260030 machine translation. (Year: 2004).*
JP-2018133166 machine translation. (Year: 2018).*
WO-2021221173 machine translation. (Year: 2021).*
International Search Report, Application No. PCT/JP2020/030241, mailed Oct. 6, 2020. ISA/Japan Patent Office.

* cited by examiner

*Primary Examiner* — Kyung S Lee
(74) *Attorney, Agent, or Firm* — Honigman LLP

(57) ABSTRACT

The resistive material contains copper and manganese, an oxide film of manganese being formed on a surface of the resistive material.

7 Claims, 5 Drawing Sheets

RESISTIVE MATERIAL, METHOD OF MANUFACTURING RESISTIVE MATERIAL, AND RESISTOR FOR DETECTING ELECTRIC CURRENT

CROSS-REFERENCE TO RELATED APPLICATIONS

This application is the U.S. national stage of PCT/JP2020/030241 filed on Aug. 6, 2020, which claims priority of Japanese Patent Application No. JP 2019-174434 filed on Sep. 25, 2019, the contents of which are incorporated herein.

TECHNICAL FIELD

The present disclosure relates to a resistive material, a method of manufacturing a resistive material, and a resistor for detecting an electric current.

BACKGROUND

As a resistor that is used for detecting an electric current, in general, a resistive material such as a copper-manganese based alloy, a copper-nickel based alloy, a nickel-chromium based alloy, or an iron-chromium based alloy is used. As the resistive material, a copper-manganese based alloy is used because of a low resistance value, a low temperature coefficient of resistance (TCR), or the like (see JP2006-270078A).

SUMMARY

However, a copper-manganese based alloy possesses low heat resistance compared to a copper-nickel based alloy and a nickel-chromium based alloy. Accordingly, it is necessary to take a measure such as restricting an upper limit of a temperature range within which the resistor can be used.

Further, in a copper-manganese based alloy, the degradation of a surface of the alloy progresses easily due to the generation of heat, and a resistance value of the alloy changes more easily with the degradation of the surface of the alloy. Accordingly, it has been also necessary to take a measure such as forming a protective film on a surface of a resistive material for preventing the degradation of the surface of the alloy.

Further, along with a tendency in recent years that electronic equipment is required to satisfy higher performance, there is an increasing demand for even higher power and accuracy with regard to resistors for detecting an electric current used in electronic equipment or the like.

It is an object of the present disclosure to enhance heat resistance of a resistive material and resistance against the degradation of a surface of a resistive material.

According to an aspect of the present disclosure, there is provided a resistive material containing copper and manganese, an oxide film of manganese being formed on a surface of the resistive material.

According to this aspect, the oxide film of manganese is formed on the surface of the resistive material that contains copper and manganese and hence, heat resistance of the resistive material can be enhanced. Accordingly, an upper limit of the temperature range within which the resistor formed by the resistive material can be used can be increased. As a result, rated power of the resistor can be increased.

Further, according to this aspect, resistance against the degradation of the surface of the resistive element caused by the use of the resistive element can be enhanced. Accordingly, a change in a resistance value of the resistive element caused by the degradation of the surface of the resistive element formed by the resistive material can be suppressed.

DESCRIPTION OF EMBODIMENTS

Resistive Material

Figure 1:
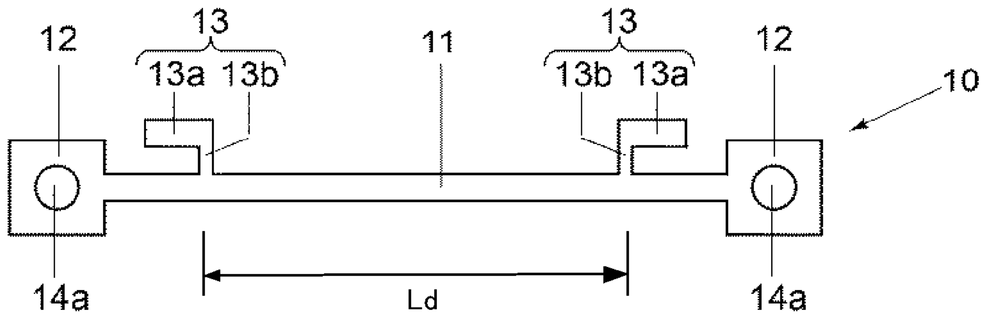
FIG. 1 is a plan view for describing a resistive element according to an embodiment of the present disclosure.

A resistive material according to an embodiment of the present disclosure is described. The resistive material according to the embodiment contains copper and manganese, and an oxide film of manganese is formed on the surface of the resistive material.

The resistive material contains 6% or more by mass and 35% or less by mass of manganese with respect to a total mass of the resistive material. When the content of manganese with respect to a total mass of the resistive material is less than 6% by mass, it is difficult to form an oxide film of manganese and hence, there is a possibility that the oxide film having a favorable thickness cannot be acquired.

When the content of manganese exceeds 35% by mass with respect to a total mass of the resistive material, a volume resistivity of the obtained resistive material becomes higher than a required value. Further, the resistive material becomes harder thereby decreasing workability of the resistive material.

The resistive material may contain, besides copper and manganese, aluminum, tin, nickel, chromium, and the like. From a viewpoint of high general-purpose use property as a resistive material, the easy formation of a manganese oxide film, and easy designing to set a volume resistivity and a temperature coefficient of resistance (TCR) to required values, manganin can be used as one example of the resistive material.

A thickness of the oxide film formed on the surface of the resistive material can be set to 70 nm or more.

When the thickness of the oxide film is less than 70 nm, with respect to a resistive element manufactured by using the resistive material, the resistive element cannot ensure a desired resistance against the degradation of a surface of the resistive element caused with the use of the resistive element. Although a thickness of the oxide film is not particularly limited, there is a concern that the oxide film is peeled off depending on the thickness of the oxide film. Accordingly, it is preferable that the thickness of the oxide film do not exceed 2000 nm.

Further, from a viewpoint of suppressing an adverse effect applied to a temperature coefficient of resistance (TCR) of the resistive material caused by the formation of the oxide film, it is preferable that the thickness of the oxide film be a thickness of 1% or less with respect to a total thickness of the resistive material. With such a configuration, TCR of the resistive material can be set to 100 ppm/C.° or less and hence, the resistive material can satisfy a characteristic of a fixed resistor.

With respect to the resistive material described above, the oxide film of manganese is formed on the surface of the resistive material that contains copper and manganese and hence, a heat resistance of the resistive material can be enhanced. Accordingly, an upper limit of a temperature range within which the resistor formed by using the resistive material can be increased. As a result, a rated power of the resistor can be increased.

Method of Manufacturing Resistive Material

Subsequently, a method of manufacturing the resistive material according to the embodiment of the present disclosure is described. The method of manufacturing the resistive material according to the embodiment is characterized in that heat treatment is applied to a resistive material that contains copper and manganese in an atmosphere where oxygen concentration is 30 ppm or less at a temperature of 490° C. or above and 750° C. or below for 10 minutes or more and 60 minutes or less.

It is preferable that the heat treatment be performed in an atmosphere where oxygen concentration is 5 ppm or more and 30 ppm or less, and more preferably in a nitrogen atmosphere where oxygen concentration is 30 ppm or less.

The temperature condition of the heat treatment can be set to 490° C. or above and 750° C. or below.

When the temperature condition of the heat treatment is less than 490° C., the resistive element prepared by using the resistive material cannot form an oxide film of manganese having a thickness capable of ensuring desired tolerance against the degradation of the surface of the resistive element due to the use of the resistive element.

When the temperature condition of the heat treatment exceeds 750° C., the oxide film having a large thickness can be formed. However, the resistive material becomes soft thereby decreasing workability of the resistive material.

The time condition of the heat treatment can be set to 10 minutes or more and 60 minutes or less. When the time for the heat treatment is less than 10 minutes, it is not possible to form an oxide film of manganese having a thickness capable of ensuring desired tolerance against the degradation of the surface of the resistive element. On the other hand, when the time for the heat treatment exceeds 60 minutes, the thickness of the oxide film becomes excessively large and hence, a temperature coefficient of resistance (TCR) becomes higher than a required value.

The terms "temperature condition" and "time condition" used in the embodiment are defined as follows. That is, the term "temperature condition" indicates a temperature of the resistive material that the resistive material attains after being raised at a predetermined temperature raising speed. The temperature condition "490° C. or above and 750° C. or below" indicates this attained temperature. The term "time condition" indicates a time during which the attained temperature is held. The time condition of heat treatment "10 minutes or more and 60 minutes or less" indicates this holding time.

By performing the above-mentioned heat treatment, an oxide film of manganese having a thickness of 70 nm or more can be formed on the surface of the resistive material. With the formation of the oxide film of manganese, the tolerance against the degradation of the surface of the resistive element prepared using the resistive material can be enhanced.

As a method of enhancing the tolerance against the degradation of the surface of the resistive material, even in the past, for example, there has been proposed a method where an oxide film of tin and/or aluminum is formed on the surface of a resistive material by adding tin and/or aluminum or the like besides copper and manganese and by applying heat treatment.

However, in a case of the resistive material made of an alloy that contains tin and/or aluminum besides copper and manganese, there is a case where tin and/or aluminum form spots in the resistive material. Under a condition where a temperature higher than a conventional temperature is required, the resistance value becomes unstable or a crack occurs at a spot portion because of the difference in thermal stress or the like.

On the other hand, inventors of the present disclosure have focused on an oxide film such as MnO, $Mn_3O_4$, $MnO_2$, $Mn_2O_3$, and have made extensive studies on these oxide films. As a result, the inventors have found that, among the above-mentioned manganese oxide films, particularly, MnO contributes to the prevention of degradation of a resistive element that appears in the form of discoloration of the resistive element.

In the embodiment, the oxide film of manganese that is a component of the resistive material is formed on the surface of the resistive material. Accordingly, compared to a case where other metals such as tin and/or aluminum are added besides copper and manganese, a change in the resistance value caused by the degradation of the resistive element can be suppressed. Particularly, it is considered that the presence of MnO in the oxide film of manganese is important for the prevention of the degradation of the resistive element.

The oxide film obtained by the method of manufacturing the resistive material according to the embodiment not only enhances the tolerance against the degradation of the surface of the resistive element prepared using the resistive material but also is not peeled off even when the resistive element is bent or cut so that the oxide film is stable whereby it is also possible to acquire an advantageous effect that the degree of freedom in plastic working of the resistive element can be increased.

Description of Resistive Element

FIG. 1 is a plan view for describing one example of a resistive element 10 prepared using the resistive material according to the embodiment of the present disclosure.

The resistive element 10 has: an elongated body portion 11; and a pair of current supply connecting portions 12 which forms both ends of the body portion 11 in a length direction. A through hole 14*a* through which the resistive element 10 and a current wire are connected with each other is formed in each of the respective current supply connecting portions 12.

Between the pair of current supply connecting portions 12 of the body portion 11, a pair of detection terminal connecting portions 13 extending from the body portion 11 is formed.

The detection terminal connecting portion 13 is formed of: a pair of first terminal portions 13*a* that extends in the arrangement direction of the current supply connecting portions 12 and is spaced apart from the body portion 11; and second terminal portions 13*b* that connect the respective first terminal portions 13*a* with the body portion 11. In this manner, the detection terminal connecting portions 13 form terminals for detecting a voltage. A distance between the first terminal portions 13*b* corresponds to a length Ld of the body portion 11.

In the embodiment, the body portion 11, the current supply connecting portions 12, and the detection terminal connecting portions 13 are formed as an integral molding made of the resistive material according to the embodiment.

As one example of a method of manufacturing the resistive element 10, the resistive material is formed into a plate shape having a predetermined thickness by working, a plurality of sheets each formed of such a plate-shaped resistive material are made to overlap with each other, and wire cut working that cuts the plurality of overlapped sheets into a predetermined resistive element shape while discharging electricity from a wire can be applied to the plurality of sheets. Alternatively, press working can be applied to the plurality of sheets in such a manner that the plurality of overlapped sheets are brought into contact with a mold having a predetermined resistive element shape and the resistive element having a predetermined shape is formed by die-cutting the plurality of overlapped sheets by a weight.

Wire cut working is efficient since working can be performed by overlapping the plurality of plate materials. Further, unlike press working where die-cut working by applying weight is performed, wire cut working minimally generates a working strain and hence, characteristics such as the resistance value of the resistive element are minimally affected. Accordingly, it is preferable to use wire cut working.

Figure 2:
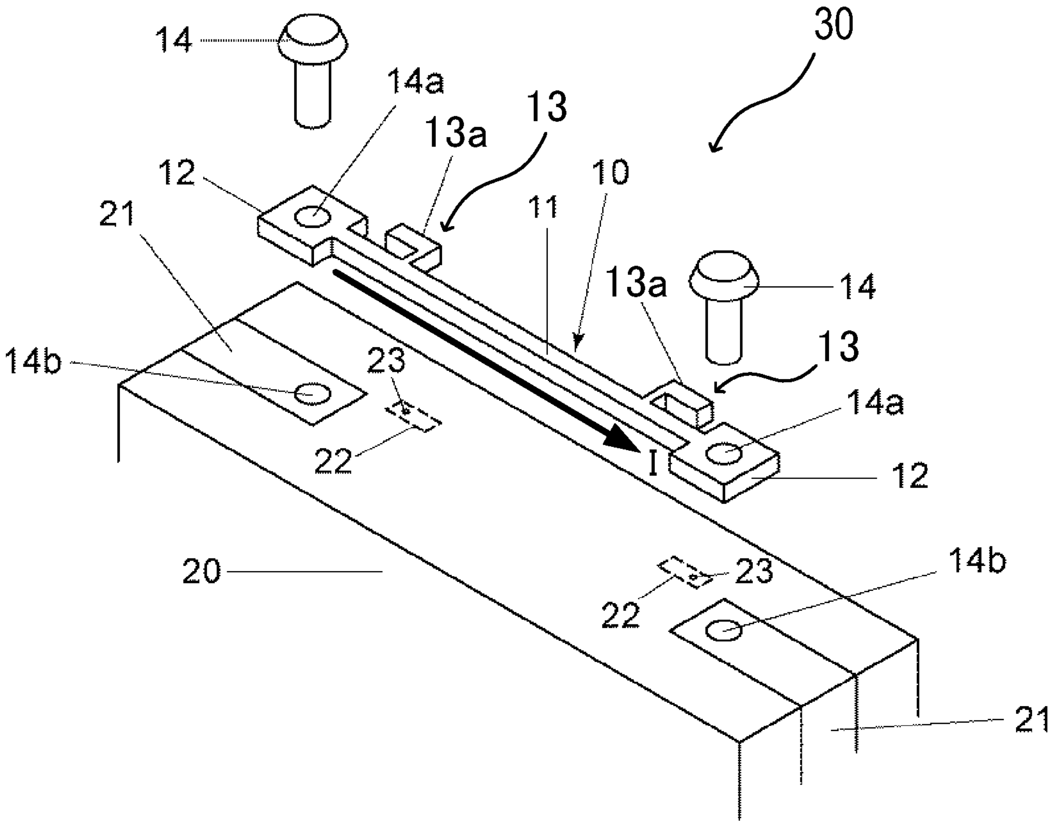
FIG. 2 is an exploded perspective view for describing resistance measuring device for measuring a resistance of a resistive element according to the embodiment of the present disclosure.

FIG. 2 is an exploded perspective view for describing a resistance value measuring device 30 that measures a resistance value of the resistive element 10.

The resistance value measuring device 30 is configured such that the above-mentioned resistive element 10 is assembled to a measurement base 20 by fixing screws 14. The measurement base 20 is formed of an insulating material, and current wire patterns 21 each formed of a copper plate member are fixed to the measurement base 20 as an example. The current wire pattern 21 is connected to a power source not illustrated in the drawing and hence, an electric current I is supplied to the body portion 11 of the resistive element 10.

In probe protruding portions 22 indicated by a broken line in FIG. 2, distal ends 23 of a probe for detecting a voltage embedded in the measurement base 20 are disposed in a protruding manner. By fixing the resistive element 10 to the measurement base 20 by the fixing screws 14, the first terminal portions 13*a* of the resistive element 10 are brought into contact with the distal ends 23 of the probe for detecting a voltage.

With such a configuration, a voltage V generated at a portion of the body portion 11 having the length Ld can be detected by a voltage detecting device not illustrated in the drawing.

In the embodiment, the body portion 11 is prepared with a fixed width and a fixed thickness and hence, a cross-sectional area of the body portion 11 becomes a uniform cross-sectional area S ($cm^2$) over a full length along a longitudinal direction. Accordingly, a volume resistivity ρ of the resistive element 10 is calculated by the following equation based on a voltage V between the detection terminal connecting portions 13, the electric current I, the cross-sectional area S ($cm^2$), and the length Ld (cm) between the detection terminal connecting portions 13, and conductivity is calculated as an inverse number of the volume resistivity ρ.

$$\rho=(V/I)\times(S/Ld)\ [\Omega\cdot\text{cm}]$$

Resistor for Detecting Electric Current

Next, one example of a resistor for detecting an electric current to which the above-mentioned resistive material on which an oxide film of manganese is formed is applicable is described in detail with reference to FIG. 3 and FIG. 4.

Figure 3:
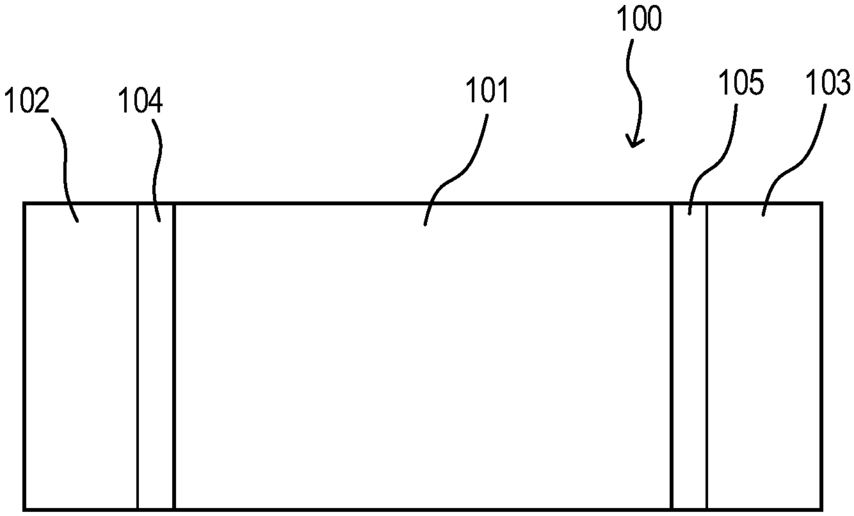
FIG. 3 is a plan view for describing one example of a resistor for detecting an electric current according to the embodiment.

FIG. 3 is a plan view for describing one example of a resistor 100 for detecting an electric current. FIG. 4 is a side view of the resistor 100 for detecting an electric current illustrated in FIG. 3.

The resistor 100 for detecting an electric current is a Shunt resistor obtained by applying working to a plate body formed using the above-mentioned resistive material. The resistor 100 for detecting an electric current has a body portion 101, a first connecting portion 102, a second connecting portion 103, a first raised portion 104, and a second raised portion 105.

The body portion 101 has a rectangular shape, and is disposed in a spaced-apart manner from a mounting surface of a printed circuit board by a predetermined distance.

One end portion of the first connecting portion 102 is connected to the mounting surface. The other end portion of the first connecting portion 102 is connected to the body portion 101 by way of the first raised portion 104. One end portion of the second connecting portion 103 is connected to the mounting surface. The other end portion of the second connecting portion 103 is connected to the body portion 101 by way of the second raised portion 105. The first raised portion 104 and the second raised portion 105 connect end portions of the body portion 101 with the first connecting portion 102 and the second connecting portion 103 so as to make the body portion 101 spaced apart from the mounting surface.

Figure 4:
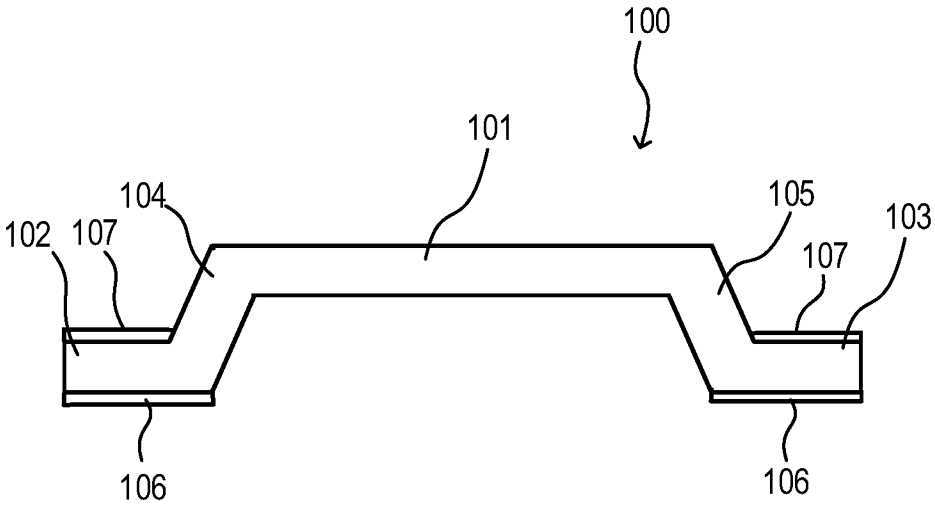
FIG. 4 is a side view of the resistor for detecting an electric current illustrated in FIG. 3.

As illustrated in FIG. 4, plating layers 106, 107 are formed on the first connecting portion 102 and the second connecting portion 103 respectively.

The resistor 100 for detecting an electric current is formed by applying press working to a resistive element having a plate shape that is formed of the above-mentioned resistive material.

Other Embodiments

The embodiment of the present disclosure has been described heretofore. However, the above-mentioned embodiment merely describes a portion of application examples of the present disclosure, and is not intended to limit the technical scope of the present disclosure to the specific configuration of the above-mentioned embodiment.

The shape of the resistive element 10 according to the embodiment is not limited to the shape described with reference to FIG. 1. In the same manner, the shape of the resistor 100 for detecting an electric current according to the embodiment is not limited to the shape described with reference to FIG. 3 and FIG. 4.

EXAMPLES

Resistive materials according to the embodiment of the present disclosure were prepared, resistive elements were prepared using these resistive materials, various measurement were performed with respect to the obtained resistive elements, and the evaluation was made with respect to these resistors. Hereinafter, a method of manufacturing specimens and the evaluation of the specimens are described.

Preparation of Specimens

Specimen T1

In preparing the specimen T1, manganin was used as a resistive material. That is, the resistive material that contains 10% to 12% by mass of manganese, 1% to 4% by mass of nickel, and 84% to 89% by mass of copper with respect to a total mass of the resistive material was used without performing heat treatment that forms an oxide film on the resistive material. The resistive material was formed into a plate shape and, thereafter, a resistive element having the same shape as the resistive element described with reference to FIG. 1 was prepared by wire cut working.

Figure 5:
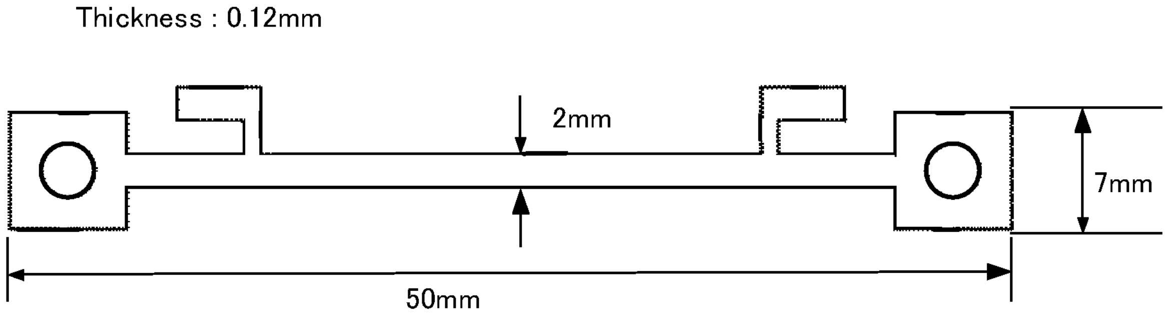
FIG. 5 is a plan view for describing a resistive element prepared for an evaluation measurement.

FIG. 5 is a plan view for describing a resistive element prepared for the evaluation measurement. In FIG. 5, sizes of respective portions of the resistive element prepared as the specimen are described. A thickness of the resistive element is 0.12 mm.

Specimen T2

With respect to the specimen T2, a resistive element was prepared in such a manner that, as heat treatment, the heat treatment was applied to a resistive material that contains copper and manganese at a temperature of 470° C. for 20 minutes, the resistive material was naturally cooled and, thereafter, the resistive element prepared was prepared by necessary processing in the same manner as the specimen T1.

Specimen T3

With respect to the specimen T3, a resistive element was prepared in such a manner that, as heat treatment, the heat treatment was applied to a resistive material that contains copper and manganese at a temperature of 490° C. for 10 minutes, the resistive material was naturally cooled and, thereafter, the resistive element was prepared by necessary processing in the same manner as the specimen T1.

Specimen T4

With respect to the specimen T4, a resistive element was prepared in such a manner that, as heat treatment, the heat treatment was applied to a resistive material that contains copper and manganese at a temperature of 490° C. for 20 minutes, the resistive material was naturally cooled and, thereafter, the resistive element was prepared by necessary processing in the same manner as the specimen T1.

Specimen T5

With respect to the specimen T5, a resistive element was prepared in such a manner that, as heat treatment, the heat treatment was applied to a resistive material that contains copper and manganese at a temperature of 500° C. for 1 minute, the resistive element was naturally cooled and, thereafter, the resistive element was prepared by necessary processing in the same manner as the specimen T1.

Specimen T6

With respect to the specimen T6, a resistive element was prepared in such a manner that, as heat treatment, the heat treatment was applied to a resistive material that contains copper and manganese at a temperature of 500° C. for 5 minutes, the resistive material was naturally cooled and, thereafter, the resistive element was prepared by necessary processing in the same manner as the specimen T1.

Specimen T7

With respect to the specimen T7, a resistive element was prepared in such a manner that, as heat treatment, the heat treatment was applied to a resistive material that contains copper and manganese at a temperature of 500° C. for 10 minutes, the resistive material was naturally cooled and, thereafter, the resistive element was prepared by necessary processing in the same manner as the specimen T1.

Specimen T8

With respect to the specimen T8, a resistive element was prepared in such a manner that, as heat treatment, the heat treatment was applied to a resistive material that contains copper and manganese at a temperature of 500° C. for 20 minutes, the resistive material was naturally cooled and, thereafter, the resistive element was prepared by necessary processing in the same manner as the specimen T1.

Specimen T9

With respect to the specimen T9, a resistive element was prepared in such a manner that, as heat treatment, the heat treatment was applied to a resistive material that contains copper and manganese at a temperature of 500° C. for 40 minutes, the resistive material was naturally cooled and, thereafter, the resistive element was prepared by necessary processing in the same manner as the specimen T1.

Specimen T10

With respect to the specimen T10, a resistive element was prepared in such a manner that, as heat treatment, the heat treatment was applied to a resistive material that contains copper and manganese at a temperature of 500° C. for 60 minutes, the resistive material was naturally cooled and, thereafter, the resistive element was prepared by necessary processing in the same manner as the specimen T1.

Specimen T11

With respect to the specimen T11, a resistive element was prepared in such a manner that, as heat treatment, the heat treatment was applied to a resistive material that contains copper and manganese at a temperature of 600° C. for 60 minutes, the resistive material was naturally cooled and, thereafter, the resistive element was prepared by necessary processing in the same manner as the specimen T1.

Specimen T12

With respect to the specimen T12, a resistive element was prepared in such a manner that, as heat treatment, the heat treatment was applied to a resistive material that contains copper and manganese at a temperature of 650° C. for 60 minutes, the resistive material was naturally cooled and, thereafter, the resistive element was prepared by necessary processing in the same manner as the specimen T1.

Specimen T13

With respect to the specimen T13, a resistive element was prepared in such a manner that, as heat treatment, the heat treatment was applied to a resistive material that contains copper and manganese at a temperature of 700° C. for 60 minutes, the resistive material was naturally cooled and, thereafter, the resistive element was prepared by necessary processing in the same manner as the specimen T1.

Specimen T14

With respect to the specimen T14, a resistive element was prepared in such a manner that, as heat treatment, the heat treatment was applied to a resistive material that contains copper and manganese at a temperature of 750° C. for 60 minutes, the resistive material was naturally cooled and, thereafter, the resistive material was prepared by necessary processing in the same manner as the specimen T1.

Specimen T15

With respect to the specimen T15, a resistive element was prepared in such a manner that, as heat treatment, the heat treatment was applied to a resistive material that contains copper and manganese at a temperature of 800° C. for 60 minutes, the resistive material was naturally cooled and, thereafter, the resistive element was prepared by necessary processing in the same manner as the specimen T1.

Evaluation Method

Observation of External Appearance of Resistive Element

A heat standing test was performed with respect to the above-mentioned specimens T1 to T15 at a condition of a temperature of 250° C. for 1000 hours, and a change in an external appearance state before and after the test was observed. Color of each specimen was observed with human eyes. The specimen which exhibited no change from color before the test (reddish brown) or the specimen where reddish brown was confirmed even after the change was determined to be qualified (good), and the specimen where reddish brown was not confirmed and the color before the test was changed to black was determined to be disqualified (not good). Further, in the comprehensive determination, the specimen where a change in color was recognized was determined to be disqualified. The specimen which exhibited excellent property as a fixed resistor was determined to be "excellent", the specimen which exhibited favorable property as the fixed resistor was determined to be "good", and the specimen which exhibited slightly inferior property but was still usable as the fixed resistor was determined to be "fair". The evaluation results are indicated in Table 1.

Measurement of Oxide Film and Film Thickness of Oxide Film

Rates of elements of the resistive element which was prepared as the specimen were measured using an Auger Microprobe (type: JAMP-9510F) (a product made by Japan Electron Optics Laboratory). Specifically, a surface analysis was performed by the above-mentioned device at depths increased at an interval of approximately 20 nm toward a thickness direction from a frontmost surface of the resistive element. In the detected rates of elements, a depth at which a rate of copper and a rate of manganese are inverted corresponds to a thickness of an oxide film.

Figure 6:
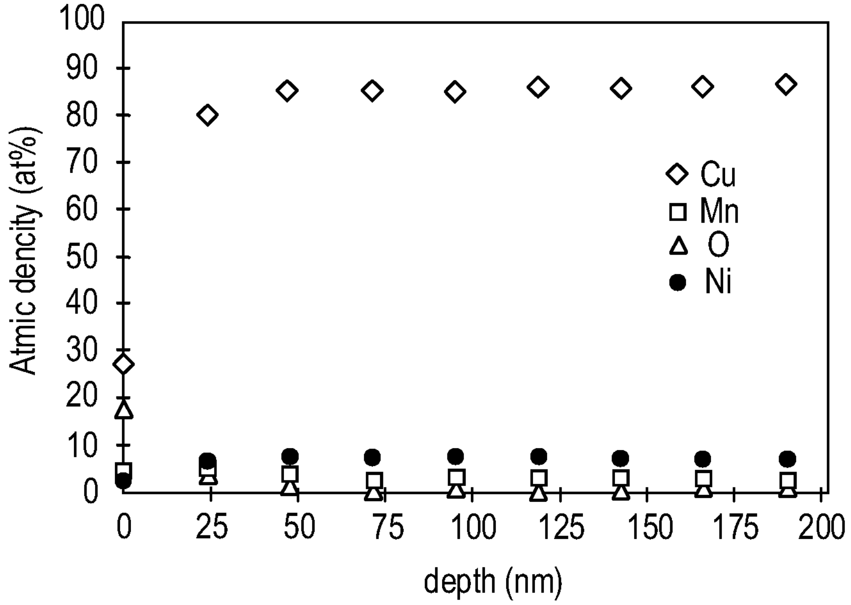
FIG. 6 is a view for describing a result of a surface analysis of a specimen.
Figure 7:
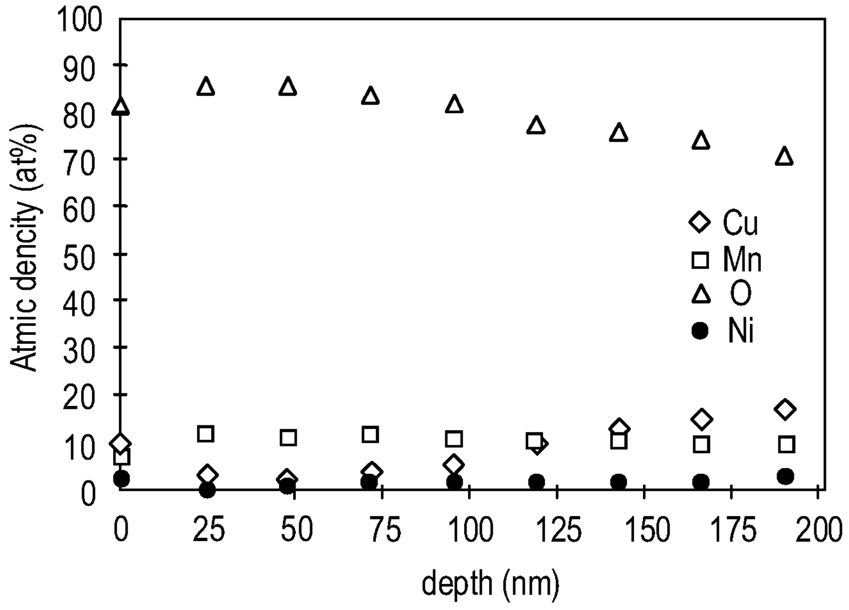
FIG. 7 is a view for describing a result of a surface analysis of a specimen.

As an example of the measurement result, the result of a surface analysis of the specimen T1 is illustrated in FIG. 6. Further, the result of a surface analysis of the specimen T10 is illustrated in FIG. 7. To compare the results of both specimens, the inversion of rates of copper and manganese was observed in the result of the specimen T10 indicating that oxide film was formed.

The measurement of the oxide film and the film thickness of the oxide film was performed with respect to some specimens among the specimens where the external appearance of the resistive element was determined to be qualified (good). Further, a rate of a thickness of the oxide film with respect to a thickness of the resistive element (0.12 mm) was calculated.

Measurement of Temperature Coefficient of Resistance (TCR)

The temperature coefficient of resistance (TCR) indicates a rate of change in an inner resistance value brought about by a change in temperature of the resistive element, and is expressed by the following equation.

$$\text{temperature coefficient of resistance (ppm/° C.)}=(R-Ra)/Ra\div(T-Ta)\times 1000000$$

where Ra denotes the resistance value at the reference temperature, Ta denotes the reference temperature, R denotes the resistance value in a steady state, and T denotes the temperature in a steady state. In this embodiment, the reference temperature was 25° C., and the temperature in a steady state was 60° C. As an allowable range of TCR when manganin is used, ±100 ppm/° C. was set as a boundary between "good" and "fair".

Change Rate of Resistance Value of Resistive Element

Among the specimens T1 to T15 to which heat treatment was applied, a heat standing test that leaves a specimen at a predetermined temperature for a predetermined time was performed and a rate of change of a resistance value before and after the heat standing test was measured with respect to the specimen T8 (an example where the specimen was heated at a temperature of 500° C. for 20 minutes), the specimen T14 (an example where the specimen was heated at a temperature of 750° C. for 60 minutes), and the specimen T1 which was prepared as a comparative example where an oxide film is not formed respectively.

A rate of change of a resistance value can be obtained by the following equation.

$$\text{rate of change of a resistance value (\%)}=((Rh-Ra)/Ra)\times 100$$

wherein, Ra is a resistance value before the heat standing test, and Rh is a resistance value after the heat standing test.

In the evaluation, the specimen which exhibits a rate of change of a resistance value that falls within a range of ±1.0% even after the heat standing test has elapsed 1000 hours was determined to be "good", and the specimen which exhibits a rate of change of a resistance value that goes beyond a range of ±1.0% at a stage where 1000 hours have not yet elapsed was determined to be "not good".

Specifically, plural sets of specimens T8, plural sets of specimens T14, and plural sets of specimens T1 were prepared. Then, a rate of change from an initial resistance value was measured by changing a standing time at a temperature of 225° C. with respect to these specimens respectively. The results are indicated in Table 2.

Evaluation Result

Measurement results of the external appearances of the resistive elements, the states of oxide films, and the temperature coefficient of resistance are indicated in Table 1, and the measurement result of the resistance values before and after the heat standing test of the resistive elements is indicated in Table 2.

TABLE 1

| | | Specimen No. | | | | | | | |
|---|---|---|---|---|---|---|---|---|---|
| | | T1 | T2 | T3 | T4 | T5 | T6 | T7 | T8 |
| heat treatment | temperature(° C.) | — | 470 | 490 | 490 | 500 | 500 | 500 | 500 |
| | time (min) | — | 20 | 10 | 20 | 1 | 5 | 10 | 20 |
| evaluation result | change in resistance value at 250° C. for 1000 hr | x | x | ○ | ○ | — | — | ○ | ○ |
| | external appearance | not good | not good | good | good | not good | not good | good | good |
| | oxide film (nm) | — | — | 74 | 118 | — | — | 80 | 119 |
| | thickness rate (%) | — | — | 0.06% | 0.10% | — | — | 0.07% | 0.10% |

TABLE 1-continued

| | | | | | | | | |
|---|---|---|---|---|---|---|---|---|
| TCR (ppm/° C.) | −14 | 4.8 | −7.1 | 4.4 | — | — | −5.1 | 6 |
| comprehensive determination | not good | not good | excellent | excellent | not good | not good | excellent | excellent |

| | | Specimen No. | | | | | | |
|---|---|---|---|---|---|---|---|---|
| | | T9 | T10 | T11 | T12 | T13 | T14 | T15 |
| heat treatment | temperature(° C.) | 500 | 500 | 600 | 650 | 700 | 750 | 800 |
| | time (min) | 40 | 60 | 60 | 60 | 60 | 60 | 60 |
| evaluation result | change in resistance value at 250° C. for 1000 hr | ○ | ○ | ○ | ○ | ○ | ○ | ○ |
| | external appearance | good | good | good | good | good | good | not good |
| | oxide film (nm) | 190 | 238 | 762 | 1140 | 1502 | 1703 | — |
| | thickness rate (%) | 0.16% | 0.20% | 0.64% | 0.95% | 1.25% | 1.42% | — |
| | TCR (ppm/° C.) | 16 | 20 | 51 | 82 | 109 | 124 | — |
| comprehensive determination | | excellent | excellent | good | good | fair | fair | Not good |

TABLE 2

| standing time (hours) at 250° C. | | 0 | 50 | 100 | 250 | 500 | 750 | 1000 |
|---|---|---|---|---|---|---|---|---|
| rate of change of resistance value (%) | T8 | 0.0 | −0.15 | −0.20 | −0.25 | −0.35 | −0.45 | −0.55 |
| | T14 | 0.0 | −0.05 | −0.08 | −0.13 | −0.20 | −0.35 | −0.45 |
| | T1 | 0.0 | −0.25 | 0.12 | 0.35 | 0.60 | 1.25 | 1.20 |

According to the results indicated in Table 1 and Table 2, it was found that, by setting the temperature condition of the heat treatment to 490° C. or above and 750° C. or below and by setting the treatment time to 10 minutes or more and 60 minutes or less, an oxide film having a thickness of 70 nm or more can be formed on the surface of the resistive material. With respect to the specimen T3, an oxide film having a thickness of 74 nm was formed. By taking into account irregularities in the manufacture, it is considered that a color change preventing effect can be obtained provided that an oxide film having a thickness of 70 nm or more is formed.

With respect to the relationship between a thickness of a resistive element and an oxide film, there is a concern that the increase of the thickness of the oxide film affects a temperature coefficient of resistance (TCR). In this respect, as can be understood from Table 1, it is found that, to make the TCR fall within ±100 ppm/° C. or less, it is sufficient to set the thickness of the oxide film to 1% or less with respect to a total thickness of the resistive element. This thickness is a thickness of the oxide film formed on the surface of the resistive element on one side. That is, for example, when the oxide film is formed on the front and back surfaces of the resistive element, the thickness of the oxide film is 2% or less with respect to the total thickness of the resistive element. Although the specimens T13, T14 exhibit inferior TCR characteristics, these specimens satisfy the external appearance test. Accordingly, these specimens can be used as a fixed resistor in applications where a strict temperature characteristic is not required.

With respect to the specimens T3, T4, T7 to T14, the degradation of the external appearance minimally occurred even after the heat standing test at a temperature of 225° C. for 1000 hours. Further, with respect to the specimens T8 and T14, as indicated in Table 2, a rate of change in resistance value is stable within a range of ±1.0% even after the heat standing test at a temperature of 225° C. for 1000 hours.

As has been described above, according to the resistive material of the embodiment of the present disclosure, an oxide film of manganese is formed on a surface of the resistive material that contains copper and manganese and hence, heat resistance property of the resistive material can be enhanced. Accordingly, an upper limit of a temperature range within which the resistor that is formed of the resistive material can be used can be increased. As a result, rated power of the resistor can be increased.

Further, according to the resistive material of the embodiment of the present disclosure, the resistance against the degradation of the surface of the resistive element brought about with the use of the resistive element can be enhanced. Accordingly, a change in the resistance value of the resistive element caused by the degradation of the surface of the resistive element formed of the resistive material can be suppressed.

The present disclosure claims the priority based on Japanese Patent Application No. 2019-174434 filed to Japanese Patent Office on Sep. 25, 2019, and all contents of this application are incorporated in this specification by reference.

The invention claimed is:

1. A resistive material containing copper and manganese, an oxide film of manganese being formed on a surface of the resistive material, wherein a thickness of the oxide film is 70 nm or more, and the thickness of the oxide film is 1% or less with respect to a total thickness of the resistive material.

2. The resistive material according to claim 1, wherein the oxide film contains MnO.

3. The resistive material according to claim 1, wherein the resistive material contains 6% or more by mass and 35% or less by mass of manganese with respect to a total mass of the resistive material.

4. A method of manufacturing a resistive material comprising, applying heat treatment to a resistive material containing copper and manganese at a temperature of 490° C. or above and 750° C. or below for 10 minutes or more and 60 minutes or less in an atmosphere where oxygen concentration is 5 ppm or more and 30 ppm or less.

5. The method of manufacturing a resistive material according to claim 4, wherein the heat treatment is performed in a nitrogen atmosphere where the oxygen concentration is 5 ppm or more and 30 ppm or less.

6. A resistor for detecting an electric current, the resistor comprising a resistive element formed of a resistive material containing copper and manganese, an oxide film of manganese being formed on a surface of the resistive material, wherein a thickness of the oxide film is 70 nm or more, and the thickness of the oxide film is 1% or less with respect to a total thickness of the resistive material.

7. The resistor for detecting an electric current according to claim 6, wherein the oxide film contains MnO.

* * * * *